P. BROADBOOKS.
VEHICLE BOW SUPPORT AND FASTENER.
APPLICATION FILED AUG. 12, 1912.
1,126,948.
Patented Feb. 2, 1915.
2 SHEETS—SHEET 1.
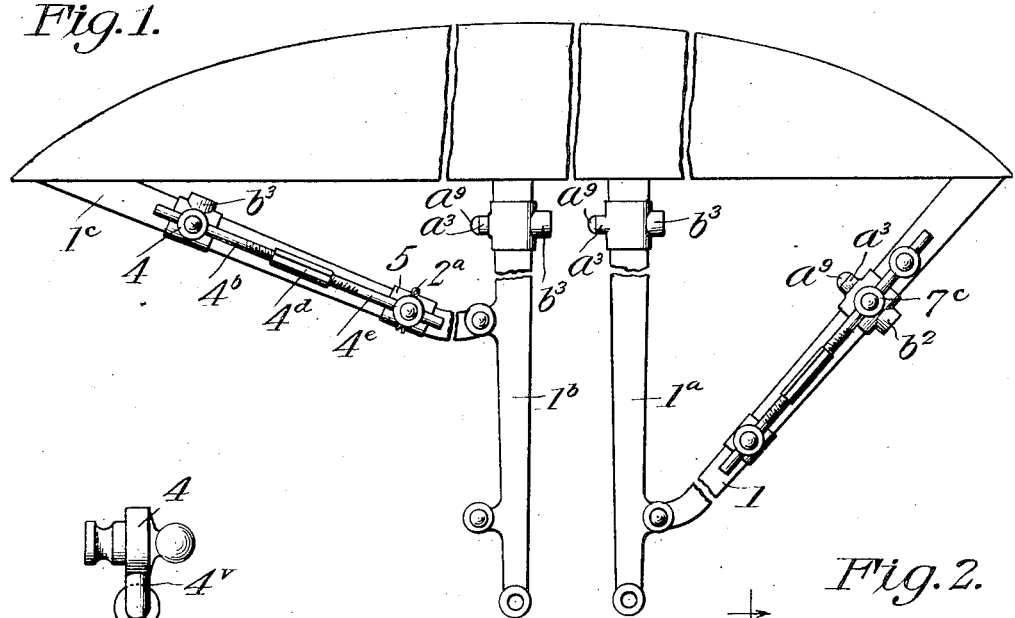
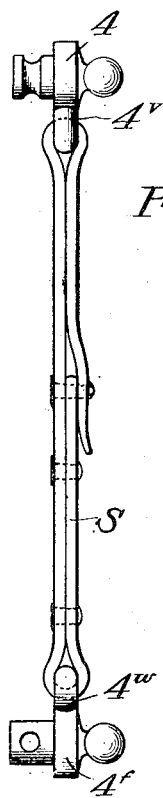
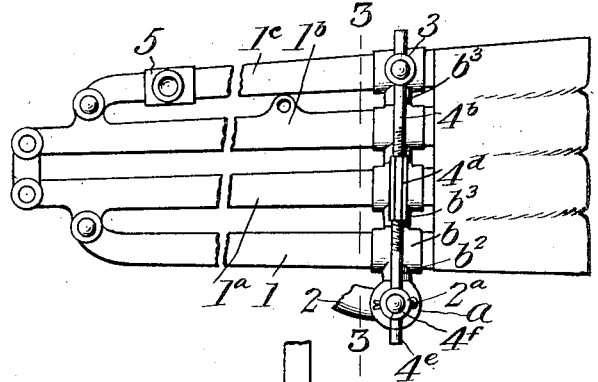
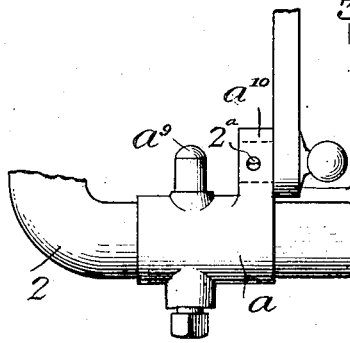
Witnesses
Fenton S. Belt
James T. Mansfield
Inventor
Peter Broadbooks
by Alexander T. Lowell
Attorneys P. BROADBOOKS.
VEHICLE BOW SUPPORT AND FASTENER.
APPLICATION FILED AUG. 12, 1912.
1,126,948.
Patented Feb. 2, 1915.
2 SHEETS—SHEET 2.
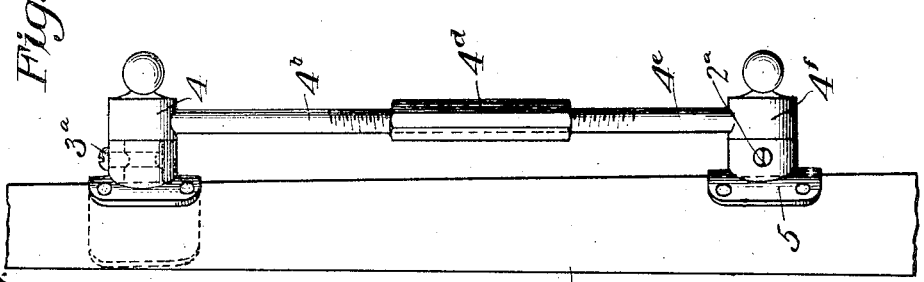
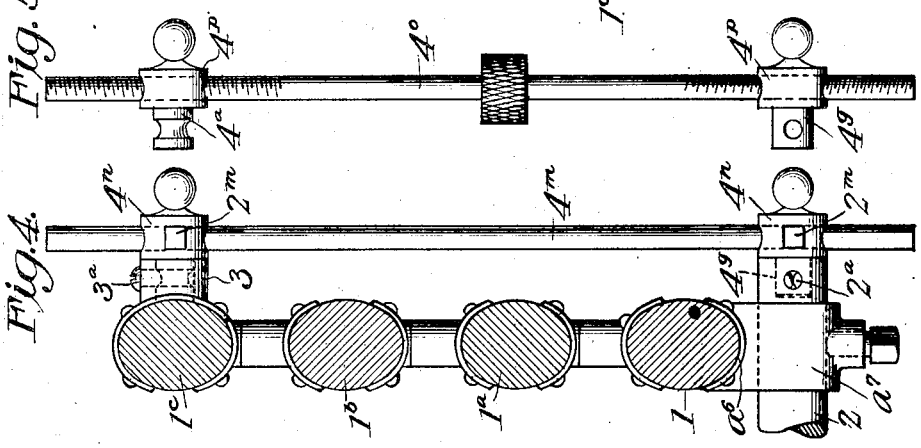
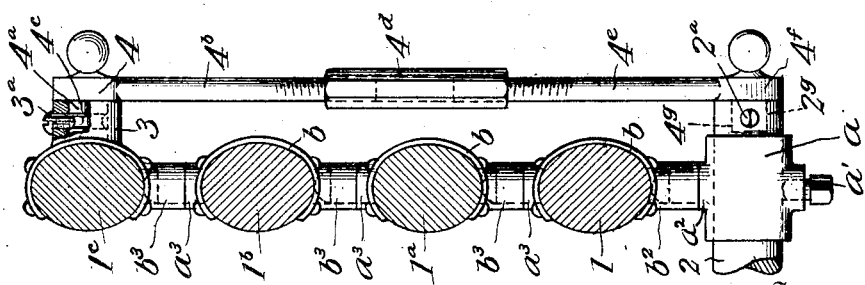
Witnesses
Fenton S. Belt
James P. Mansfield
Inventor
Peter Broadbooks
by Alexander Lowell
Attorneys

UNITED STATES PATENT OFFICE.

PETER BROADBOOKS, OF BATAVIA, NEW YORK.

VEHICLE BOW SUPPORT AND FASTENER.

1,126,948.   Specification of Letters Patent.   Patented Feb. 2, 1915.

Application filed August 12, 1912. Serial No. 714,724.

*To all whom it may concern:*

Be it known that I, PETER BROADBOOKS, of Batavia, in the county of Genesee and State of New York, have invented certain new and useful Improvements in Vehicle Bow Supports and Fasteners; and I hereby declare that the following is a full, clear, and exact description thereof, reference being had to the accompanying drawings, which form part of this specification.

This invention is a novel means for binding together the bows of folding vehicle tops when folded, and its objects are to lock the bows to the props of an automobile top by novel mechanical devices, in place of the leather straps and buckles now in general use; thereby doing away with the coiling up of such straps and enhancing the appearance of the top, both when it is extended and when it is folded upon the props; also to secure the bows to the props with greater convenience than by binding with leather straps; to hold the top when folded more rigid and safely than can be done with the leather straps as now used.

The invention further provides bow supports that act in conjunction with the binding device to more securely hold the bows.

I will explain the invention in detail with reference to the accompanying drawings in which I have illustrated the invention embodied in several equivalent constructions.

In said drawings—Figure 1 represents a side elevation of a foldable top or cover of a vehicle extended, said top being equipped with my invention; and showing the preferred arrangement of the tie when not in use in full lines. Fig. 2 is a similar view with the top folded and locked. Fig. 3 is an enlarged sectional view on line 3—3, Fig. 2. Fig. 4 is a section similar to Fig. 3, illustrating a modified construction of the parts. Fig. 5 shows the tie rod formed with right and left hand threads, engaging the heads. Fig. 6 is a detail showing how the tie may be attached to a bow when not in use. Fig. 7 illustrates how a strap may be used as a tie. Fig. 8 shows how the tie may be connected with the collar on the prop.

In the drawings 1, $1^a$, $1^b$, $1^c$, designate the bows of a folding vehicle top which may be of any suitable construction. As shown the rear bow 1 is pivotally connected to the adjacent bow $1^a$; and the front bow $1^c$ is pivotally connected to the adjacent bow $1^b$. The particular construction of the top and its bows do not form any part of my present invention; when the top is extended the bows are separated and when the top is closed the bows are brought close together substantially as indicated in Fig. 2; and are usually supported on a suitable prop or arm 2 attached to the vehicle, which supporting arm may be of any suitable construction.

In order to hold the bows securely together when the top is folded and to prevent rattling thereof I provide them with novel tying and any suitable supporting devices.

Attached, preferably, to the uppermost or front bow $1^c$ is a tie retainer socket piece 3 (Fig. 3) which may be formed and connected with the uppermost socket piece $b^3$ as indicated in Fig. 4, and secured therewith to the bow $1^c$ by suitable screws as shown. The socket piece 3 is provided with an opening adapted to receive a stud $4^a$ having a head 4, which is shown in Fig. 3 as rigidly connected to a rod section $4^b$. This stud $4^a$ may be provided with an annular groove $4^c$ adapted to be engaged by one end of a screw $3^a$ tapped through the socket piece 3 so as to retain the stud 4 in the socket and at the same time permit it to turn. The free end of rod $4^b$ is threaded and engaged with one end of a turnbuckle $4^d$ and the other end of said turnbuckle is engaged with the oppositely threaded end of a rod $4^e$ which is attached at its other end to the head $4^f$ of a stud $4^g$ which is adapted to enter a corresponding socket $2^g$ in the end of the support 2 (Fig. 3) when the top is folded and may be detachably secured in said socket by means of a cotter or split pin $2^a$, the stud $4^g$ and prop being perforated for the passage of said pin as indicated in the drawings. The rods $4^b$, $4^e$ and buckle $4^d$ form a tie and will, when in the position shown in Fig. 3, hold the bows of the folded top securely together.

When the top is to be extended, pin $2^a$ is withdrawn so as to permit the head $4^f$ to be disengaged from the socket $4^g$, then the top is opened and the bows separated as shown in Fig. 1; and when so opened the several studs and sockets are separated according as they are attached to the respective bows, and the tie ($4^b$, $4^e$ and $4^d$) will then be suspended from the bow $1^c$; I provide the bow $1^c$ with an auxiliary tie retainer or socket piece 5, (see Figs. 1 and 2) with which the stud $4^g$ may be engaged and in which it can be retained by the same cotter pin $2^a$; and when so engaged the tie will be neatly held out of the way, (see Figs. 1 and 6).

When the top is folded the studs $a^2, a^3$ and related sockets $b^2, b^3$ properly separate the bows as in Fig. 3, and effectively prevent relative play of the bows one upon the other, when folded.

In Fig. 4 I have also shown how a plain tie rod $4^m$ may be used in place of the adjustable sectional tie rod in Fig. 3. The tie rod $4^m$ has its ends inserted through openings in the heads $4^n$ of the studs, and may be secured thereto by set screws $2^m$; the upper head $4^n$ may be secured to the socket piece 3 by a screw $3^a$ and the lower head $4^n$ may be detachably connected to the socket piece $4^g$ by pin $2^a$, as in Fig. 3. In Fig. 4 instead of the collar $a$ shown in Figs. 1–3, I have a collar $a^7$ provided with a concave rest $a^6$ on which the lower bow 1 is supported.

In Fig. 5 I show a tie rod $4^o$ connected to the heads $4^p$ by means of opposite threaded portions engaging suitable threaded openings in said heads $4^p$; which heads are provided with studs $4^a$ and $4^g$ to engage the socket pieces 3 and $2^g$ as described.

In Fig. 7 I show a tie strap employed in place of a rod to connect the heads 4 and $4^f$. In this construction the heads 4 and $4^f$ may be provided with eyes $4^v$ and $4^w$ through which the strap S is passed.

It is obvious that any suitable tie device may be employed, but I prefer to use a rod for tying the bows to the prop, as it can be made more easily adjustable, and has a more symmetrical appearance. It is also obvious that other suitable means may be employed for detachably connecting the tie to the prop, or to the bows.

The principal feature of the invention is a detachable swiveled tie connection which can be carried wholly by one of the bows when the top is up. In this manner the props are freed from any ties or straps while the top is in an upright position. It is obvious that the invention may be made equally operative by swiveling the tie to the rear bow intermediate its ends, as shown at $7^c$ in Fig. 1.

As shown in Fig. 8 the tie head $4^f$ may be connected with a socket piece $a^{10}$ on the collar $a$ instead of to the prop direct.

What I claim is:

1. In combination with a folding top, and a support for said top when folded; a tie having one end pivotally attached to one of the bows of the top, and an auxiliary device attached to the same bow adapted to be detachably engaged by the free end of said tie when the top is extended to hold the tie thereagainst and parallel with said bow; with means for detachably attaching the free end of said tie to said support when the top is folded, substantially as described.

2. In combination with a folding top, and a prop for the bows when folded; of a tie pivotally connected to the upper part of a bow of the top; an auxiliary device attached to such bow; the free end of said tie being adapted to be detachably attached to said auxiliary device to hold the tie parallel with the bow when the top is extended; with devices on said prop adapted to be also engaged by the free end of said tie when the top is folded to hold the bows in folded position, substantially as described.

In testimony that I claim the foregoing as my own, I affix my signature in presence of two witnesses.

PETER BROADBOOKS.

Witnesses:
R. K. Cory,
Earle B. Perry.